H. A. MYERS.
SCALE.
APPLICATION FILED JAN. 20, 1913.
1,213,934.
Patented Jan. 30, 1917.
3 SHEETS—SHEET 2.
FIG. 4
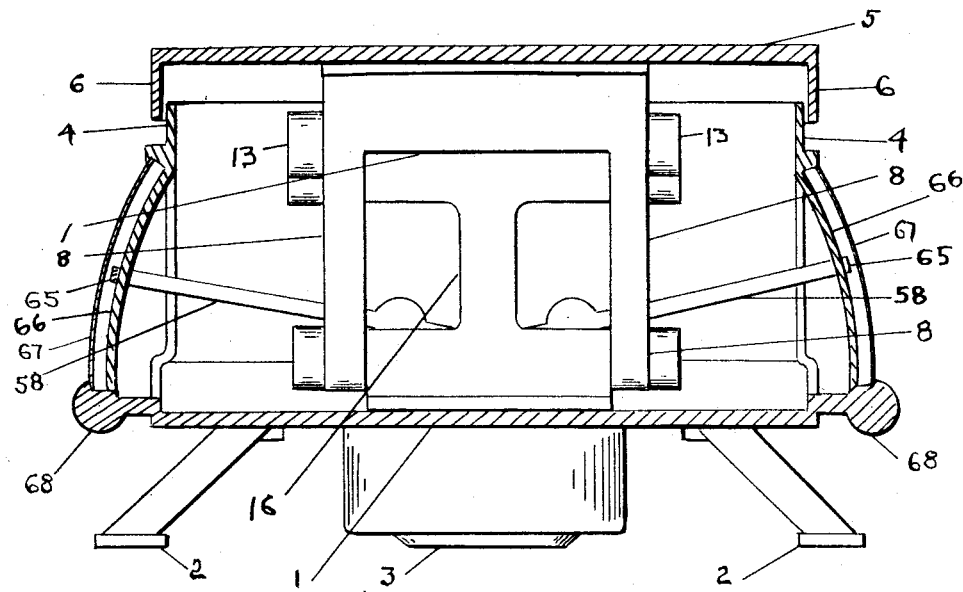
FIG. 5
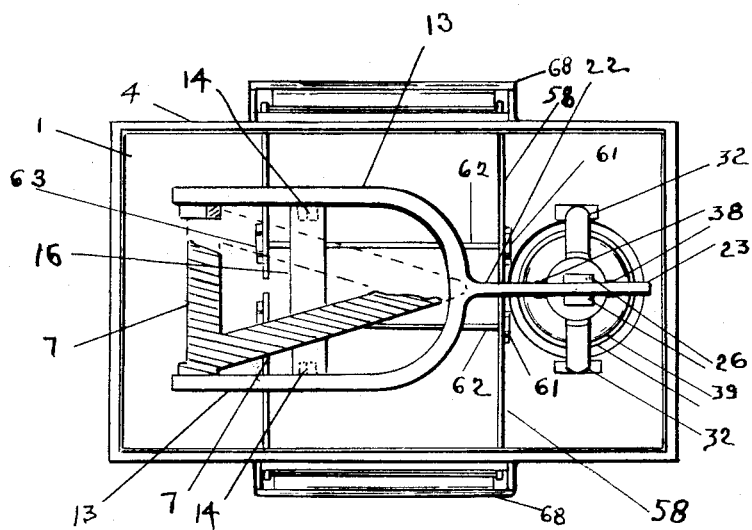
WITNESSES:
INVENTOR
Hubert A. Myers
BY
ATTORNEY H. A. MYERS.
SCALE.
APPLICATION FILED JAN. 20, 1913.
1,213,934.
Patented Jan. 30, 1917.
3 SHEETS—SHEET 3.
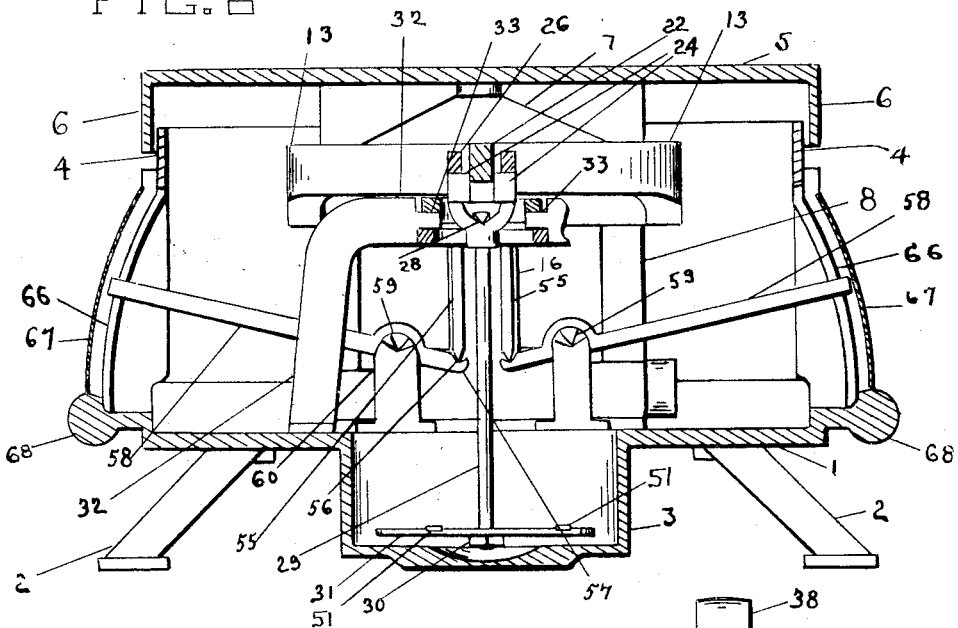
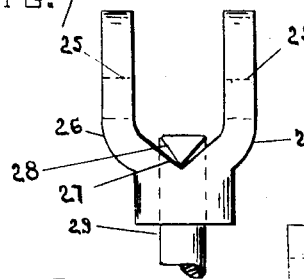
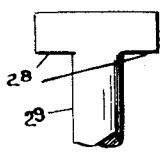
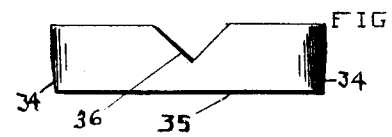
WITNESSES:
INVENTOR
Hubert A. Myers
BY
Geo E Kirk
ATTORNEY

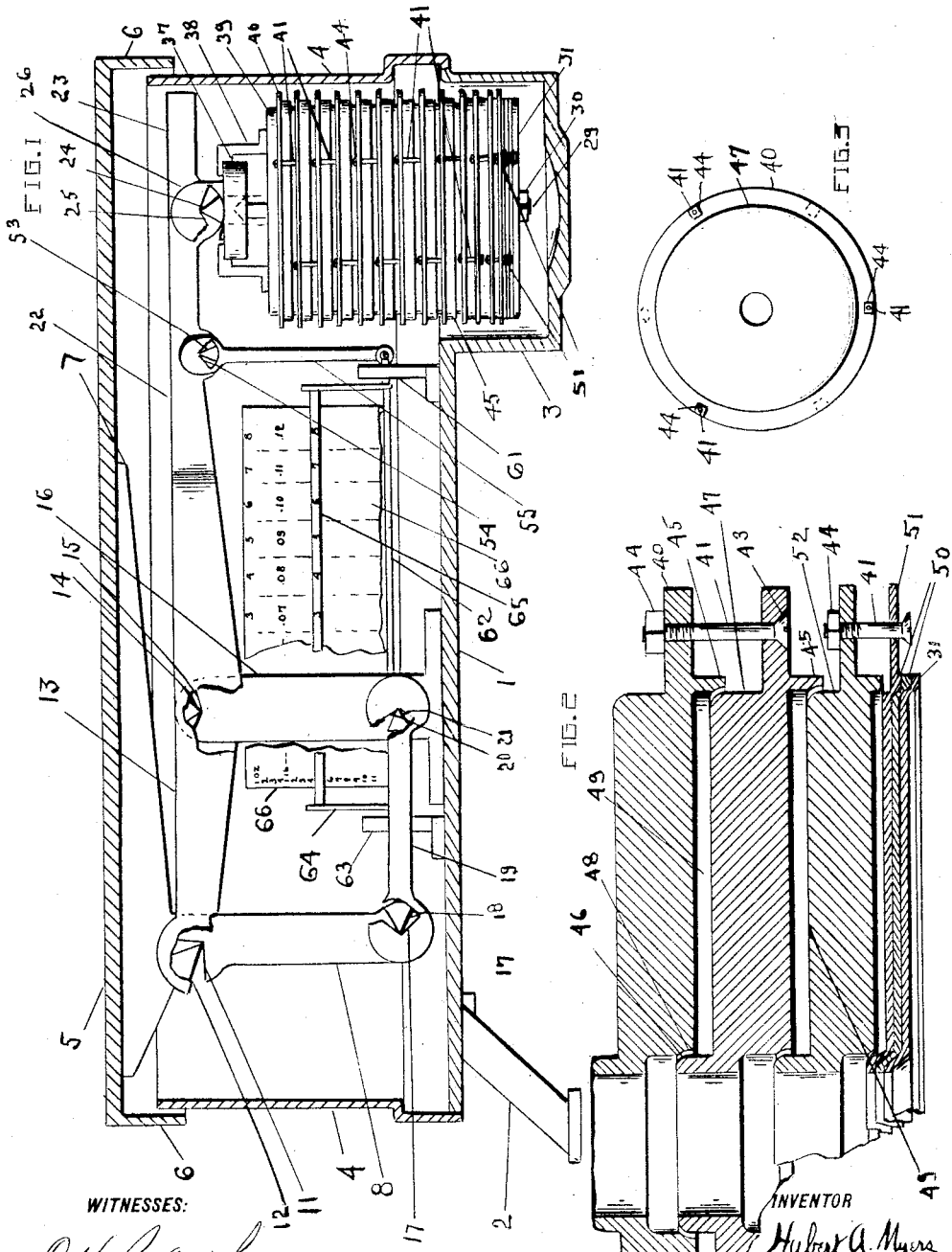

UNITED STATES PATENT OFFICE.

HUBERT A. MYERS, OF TOLEDO, OHIO, ASSIGNOR, BY DIRECT AND MESNE ASSIGNMENTS, TO TOLEDO SCALE COMPANY, OF JERSEY CITY, NEW JERSEY, A CORPORATION OF NEW JERSEY.

SCALE.

1,213,934.              Specification of Letters Patent.        Patented Jan. 30, 1917.

Application filed January 20, 1913.   Serial No. 743,121.

*To all whom it may concern:*

Be it known that I, HUBERT A. MYERS, a citizen of the United States, residing at Toledo, Lucas county, Ohio, have invented a new and useful Scale, of which the following is a specification.

This invention relates to weighing scales, and particularly to automatic scales of the step-by-step type, wherein the load-offsetting means is formed by independent counterweights suitably positioned to be successively brought into operation to counterbalance the load placed upon the scale platform.

The primary object of this invention is to provide a scale particularly adapted for use in parcels post weighings, and which will be free from the numerous objectionable features of the scales hitherto employed for this purpose.

One of the distinctions between parcels post work and similar weighings is that it is not essential that fractions of an ounce be indicated, for a weight slightly exceeding one ounce is regarded as weighing two ounces, etc., but it is necessary that the excess of the weight over one standard be clearly indicated, and the scale must be constructed to withstand repeated shocks and jars, and be sufficiently responsive to quickly and accurately indicate the proper postal weight without excessive oscillation of the indicator. This invention, therefore, is to provide a strong, compact and substantial scale, which embodies step-by-step weighing mechanism with provision to automatically cushion the concussion of a shock upon the scale platform and also dampen the movement of the indicator to prevent its excessive oscillation.

While especially adapted for use in parcel post work, this invention is also capable of a wide variation of uses, and many features of the invention will be found useful and may be employed in scales especially designed for other classes of weighings, as well as in machines other than weighing scales.

Referring to the drawings: Figure 1 is a side elevation of the invention, with the housing and other portions broken away, as embodied in a platform scale or weighing device; Fig. 2 is a fragmentary section of a group of dash pot step by step counterpoise means; Fig. 3 is a plan view of one of the counterpoise means or weights; Fig. 4 is an end elevation from the left in Fig. 1, with the housing broken away; Fig. 5 is a plan view with portions of the platform broken away; Fig. 6 is an end elevation from the right in Fig. 1, with the housing and parts broken away; Fig. 7 is a fragmentary elevation of the counterpoise suspension from the beam; Fig. 8 is a view of the suspension link from the right of Fig. 7; Fig. 9 is a plan view of the link of Fig. 7; Fig. 10 is a fragmentary elevation of the weight carrier or pick up from the right of Fig. 7; Fig. 11 is a fragmentary plan view of the counter weight mounting link and connections; Fig. 12 is a side elevation of the mounting link of Fig. 11; and Fig. 13 is a side elevation of the mounting link of Fig. 12 from the right thereof.

The weighing device is shown as mounted in a housing comprising the base 1 having near one end thereof the pair of legs 2 and centrally of the opposite end the hollow well or foot 3. The housing has the lateral or inclosing wall 4 above which is the platform 5. The flange 6 surrounding and downwardly extending from the housing top or platform 5 forms a loose telescopic joint with the uprising housing wall 4. The under side of the platform 5 has the reinforcing sections 7 from which extend downwardly the pair of tilt-precluding arms 8. Coacting with the bearings 11 rigid with the platform 5 is a pair of knife edge bearings 12 on the lever or main beam 13, which lever carries fulcrum knife edge bearings 14 coacting with the stationary bearings 15 of the fulcrum bracket 16.

The tilt-precluding arms 8, which compel the platform 5 in its reciprocations to travel throughout its extent in parallel planes, have near their lower ends knife edge bearings 17 with which coact the bearings 18 of the links 19 which near their opposite ends are provided with bearings 20 coacting with the stationary knife edge bearings 21 on the base of the fulcrum bracket 16, these links being arranged substantially parallel with the main beam and a parallelogram is formed governing the motion of the platform by constructing the links 19 with their active length the same as the length of the beam 13 between its fulcrum bearings 14 and its platform sustaining the bearings 12.

The main beam or lever 13 is formed with a pair of arms at one end, see Fig. 5, and these arms converge on the side of the fulcrum 16 remote from the platform sustaining bearings 12 to form the arm 22 which is shown as provided with a pair of knife edge bearings 24 coacting with the opposing bearings 25 of the suspension link 26. A nose or extension 23 may be formed on this arm 22 to assist in normally counterbalancing the weight of the opposite side of the beam. To insure universal hanging in plumb, this suspension link 26 has disposed 90° from the bearings 25, a pair of bearings 27 for the pair of knife edge bearings 28 on the weight carrier or pick up member 29 (see Figs. 7 and 9).

The pick up member 29 carries at its lower end the nut 30 serving to adjustably position the terminal counterpoise 31, which rests loosely upon the nut 30. On opposite sides of and adjacent the well 3 are brackets 32 having at their upper extremities knife edge bearings 33 coacting with the ring bearings 34 in the mounting link 35 to support said link and the counterpoises or weights 39 suspended therefrom. To insure leveling and hanging in plumb of the suspended parts, this link 35 has 90° from the bearings 34, the bearings 36 with which may coact the knife edge bearings 37 of the upstanding brackets 38 from the upper counterpoise or weight 39. The weights 39 may be of any suitable shape or size, but are here shown and preferably constructed with body portions 47 having central raised neck-portions 46 and depending guide flanges 45 adjacent their outer edges, recesses 48 being also provided in the under side of the body portions to receive the raised neck-portions of the next adjacent weights when the several weights are brought into close engagement. Each weight 39 is provided with the extension flange 40 up through which may extend the bolts 41 from a similar flange 40 of the next counterweight 42 therebelow. The heads 43 of the bolts 41 loosely engage from below the flanges 40, while the upstanding protruding end of the bolt 41 may carry a nut 44 to adjust the clearance between the flanges 45, 46, and the opposing walls of the body-portion 47, and the recess 48 of the pair of adjacent weights, forming the chamber 49 therebetween, and adjustments are facilitated by staggering these bolts 41 for the successive weights, producing dash pots between the weights from which the escape of air upon concussion may be regulated to effectually absorb vibration.

In the adaptation of the device for parcels post service, the lever arms may conveniently be so disposed on opposite sides of the fulcrum bearings that the relation exists of say two to one as the counterpoise supporting arm is to the platform supporting arm. With such an arrangement the counterpoise weights would for pounds each weigh one-half pound and for ounces one-half ounce. Inasmuch as the usual parcel post scale runs in ounces from one to four, and then to pounds, the counterpoises employed herein may be readily designed to meet such conditions by so adjusting the nut 30 on the pick-up member that the lowermost counterpoise 31 will not be lifted until one ounce is placed on the platform 5, and making the four lowermost weights of a weight of one-half ounce each. Thus, as shown in Figs. 1 and 2, weights such as are designated by the numeral 50 may be provided instead of weights of a shape and size corresponding to the weights 39, and instead of having rings 40 for the suspension bolts 41 lugs 51 may be suitably staggered for the reception of these bolts. As the step from exceeding four ounces is to one pound, the proportional counterweight disk 52 is provided therefor next above the weights 50. With the range to be eleven pounds, a sufficient number of the weights 42 is then provided with a suitable staggered three point suspension from the automatically universally leveling link ring 35. The flanges of these weights provide close clearance centrally and peripherally between the disk weights, and in each instance there is thus entrained a chamber for quite a volume of air, thereby forming a succession of dash pots in the step-by-step weight grouping.

In operation, the main beam 13 rocks on the fulcrum bearings 14 and at all positions maintains the constant proportional relation of the two arms of the lever to each other, insuring that with similar or identical counterweights at different inclinations of use, identical steps in weighing action will occur. Accordingly, with the two to one relation between the arms of the main beam, the counterweights may each be one-half actual weight desired throughout the entire range of use and such weights may be interchanged to any place in the suspension and produce identical steps as at any other point, and also equal steps with similar weights at other points. Additionally, the universal suspension of the pick-up member 29 from the beam 22, and the universal suspension of the counterweights and the ring 35 around the pick-up member permit true or plumb hanging of these devices at all times in position for immediate use, thereby eliminating necessity for delicate adjustments in leveling up the mechanism to insure accurate operation.

When parcels to be weighed are heavily thrown upon the platform, the concussion thereby caused is taken up by the series of dash pots in the counterweight group, and the platform quickly comes to rest in its proper settled position after picking up such number of weights as are necessary to counterbalance the object being weighed. When the weight of the parcel is too great to be offset by any one counterweight or set of counterweights, the pick-up member moves to the location required for lifting the next higher weight with a definite and clearly defined movement. The pronounced nature of these movements in offsetting the weight upon the platform may be readily utilized for clearly and accurately indicating the weight of the parcel being weighed. To avail of this, indicating mechanism is shown, embodying the knife edge bearings 53 on the lever 22, coacting with the bearings 54 of the downwardly extending links 55 which have knife edge bearings 56 on their lower extremities coacting with the bearings 57 of the levers 58. These levers 58 have intermediate their ends knife edge bearings 59 coacting with the fulcrum bearings 60 in the upstanding brackets 61 carried by the housing. Extending from the lever 58 in line with the bearings 59 are the rods 62, the opposite ends of which are suitably mounted in the brackets 63, arms 64 corresponding to the outer or free arms of the levers 58 extending from the rods 62 adjacent these brackets. Connecting each arm 64 with the outer lever arm 58 and parallel to said lever is the indicating bar 65 movable over the chart or scale 66 which may be shielded behind the window 67. The indicator bar 65 in the embodiment herein shown is normally elevated and swings downward upon the raising of the arm 22 of the main beam 13 to indicate weights upon the chart 66, see Fig. 1, and these falls of the indicator bar are of appreciable lengths because of the distinct upward movement of the pick-up member when an additional weight is lifted. These indicating diagrams or scales are shown in duplicate below the platform lever, and disposed for distinct reading from either side of the weighing device. Thus if a parcel was placed upon the platform 5 weighing the slightest fraction over four pounds, the bar 65 would make a clear and well defined step from any four pound reading to a pronounced position in the five pound spacing, and this would be clearly indicated on both charts, and in the column showing the particular zone desired the rate and charge for this weight would be shown. This is due to the fact that upon overcoming the counterpoise of weights to and including four pounds, the least weight in excess thereover causes a closure of the dash pot gap between this closed group of weights and the next suspended weight, the beam advancing an appreciable distance in taking up this weight so that the indication is accordingly clear. The weighing device, therefore, possesses marked value for quick and accurate computations. The various adjustments permit the ready working out of all the essential niceties in indicator positioning, weight disposal and dash pot operations. The pair of grips 68 provide ready holding means for shifting the device.

It will be seen that the above described embodiment of my invention provides means well calculated to adequately fulfil the objects primarily stated. The construction is, however, susceptible of modification without departing from the spirit and scope of the invention as set forth in the following claims.

I claim—

1. A weighing device embodying an automatic step by step counterpoise comprising counterweights, pick up means for the counterweights and adjusting means for varying the pick up distance between the counterweights.

2. A weighing device embodying a main lever, a load bearing for said lever, a counter weight bearing for said lever, a fulcrum in line with said bearings, a series of successively acting counterweights for the lever, pick up means for the counterweights, and adjusting means for varying the pick up distance between the counterweights.

3. A weighing device embodying a universally suspended counterpoise pick up member, concentric counterpoise means to be picked up by said member, and universal joint supporting means for the counterpoise means.

4. A weighing device embodying a pick up member, counterweights, and universal joint sustaining means for said counter weights, said counterweights surrounding the member and disposed to be picked up by said member.

5. A weighing device movable in operation to have counterpoise action and embodying a plurality of dash pots disposed for successive actuation, said dash pots having restricted discharge openings therefrom.

6. A step by step weighing device movable in operation to have counterpoise action and embodying a series of load receiving concussion dash pots, said dash pots having restricted discharge openings.

7. A weighing device embodying a pair of counter weights providing a dash pot therebetween having a restricted discharge opening, said dash pot being formed by one of the counter weights moving toward and picking up the other.

8. A step by step weighing device embodying a series of interchangeable similar mass counterweights, means for suspending said counterweights to allow swinging movement thereof, and an automatic pick up therefor.

9. A step by step weighing device including a series of counterweights, means for supporting the uppermost of said counterweights, means for suspending the remainder of said series of counterweights from the uppermost thereof in normal separated relation, and an automatic pick-up coöperating with the counterweights.

10. In a step by step weighing device, interchangeable counterpoise weights, each comprising a body portion, a central apertured neck-portion, and a depending guide flange adjacent its outer edge adapted to surround the body portion of the next adjacent weight.

11. In a step by step weighing device, interchangeable counterpoise weights, each comprising a body portion, a central apertured neck-portion, a depending guide flange adjacent its outer edge, and an extension flange apertured to loosely receive supporting elements.

12. In a step by step weighing device, a series of interchangeable counterpoise weights, each comprising a body portion having a central recess in its lower side, a raised neck-portion, and a depending guide flange adjacent its outer edge, the raised neck-portion and body portion of one weight being arranged to fit closely within the central recess and guide flange respectively of the next adjacent weight of the series.

13. In a step by step weighing device, a pick-up member, a series of counterweights coöperating therewith, a support for said counterweights, and an automatic leveling link arranged between the uppermost of said counterweights and said support.

14. In a weighing scale of the class described and in combination with the beam thereof, a pick-up device pivotally suspended from said beam, a series of counterweights suspended above the pick-up device, and means for pivotally suspending said counterweights having provision for universal movement about the center of suspension.

15. In a weighing scale of the class described and in combination with the beam thereof, a pick-up device comprising a support and a rod pivotally suspended from the beam, a series of annular pick-up weights, and means for pivotally suspending said pick-up weights concentric with said rod having provision for universal movement about the axis of said rod.

16. In a weighing scale and in combination with the beam thereof, a pick-up device comprising a pivotally depending rod and a supporting plate, an annular series of counterweights surrounding the rod, a support for said series of counterweights and a pivotal connection between said support and series of counterweights adjacent the pivotal connection of said pick-up device.

17. In a weighing scale of the class described and in combination with the beam thereof, a series of counterweights, means for supporting the counterweights with provision for relative vertical movement between the same, telescoping walls formed on said counterweights adapted to form dashpots between the same, and the pick-up device attached to the beam and arranged to successively pick up said counterweights.

In testimony whereof I affix my signature in the presence of two witnesses.

HUBERT A. MYERS.

Witnesses:
C. H. RAUCH,
GEO. E. KIRK.